Patented Jan. 17, 1928.

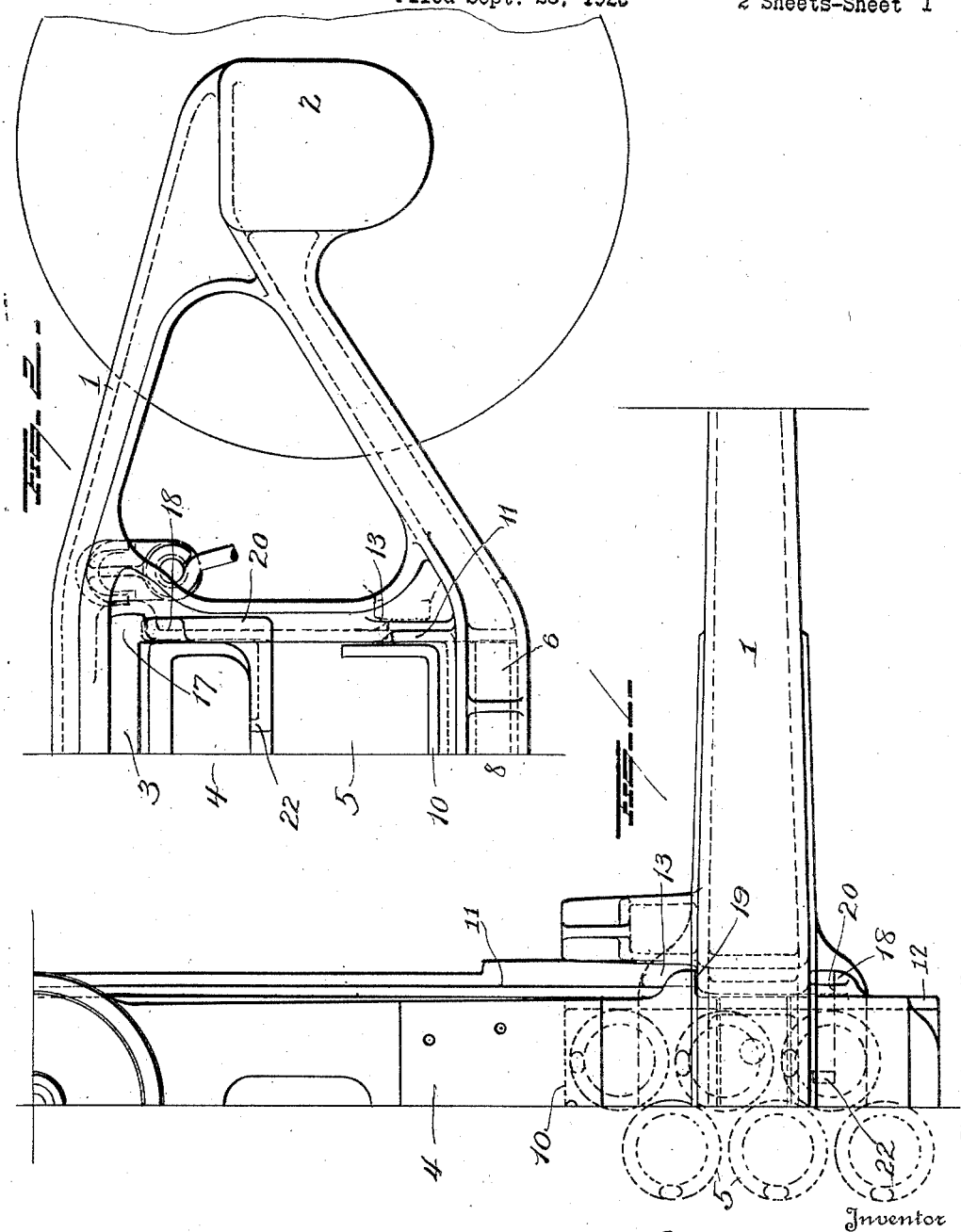

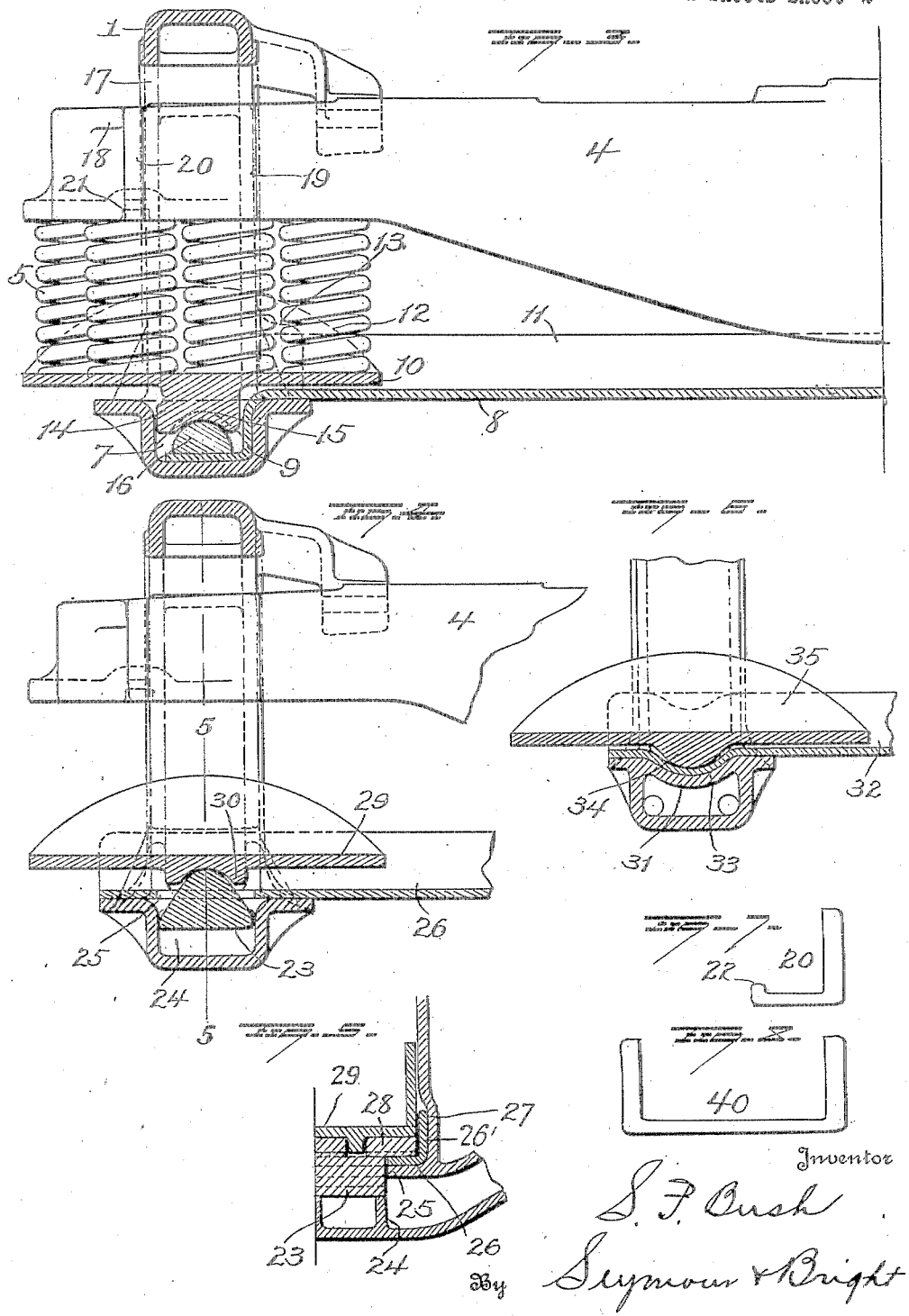

1,656,166

UNITED STATES PATENT OFFICE.

SAMUEL PRESCOTT BUSH, OF COLUMBUS, OHIO, ASSIGNOR TO THE BUCKEYE STEEL CASTINGS COMPANY, OF COLUMBUS, OHIO.

SPRING SUPPORT.

Application filed September 28, 1925. Serial No. 59,168.

This invention relates to car trucks of the four-wheel type and has special reference to the means for supporting the springs. In trucks of this type, the load is carried on the bolster center bearing and transmitted to the truck springs which are supported by side frames, said frames in turn resting directly on the axle journals. According to the usual practice, the springs have been arranged in rectangular relation which necessitated a seat of considerable extent so that unequal deformations of the springs at opposite sides of a group or nest of springs was caused by track irregularities, and the larger the spread of the spring bearing surface the greater was the disturbance of the equalization of load on the four journals of the truck. The width of the end of a truck bolster is proportionate to the width of the group of springs upon which it rests, and, of course, the wider the spring group the more will the equalization of journal loads be disturbed by uneven track conditions, this disturbance being detrimental to the journals and journal bearings and also to the strength of the side frames, it being obvious that any disturbance of the load symmetry longitudinally of the track tends to overload that end of the frame which is elevated relative to the other end. The strength and life of the springs are also affected adversely by the disturbance of the load. While the tendency of the bolster spring seat is to remain in a horizontal plane, notwithstanding track irregularities, the spring seat on the frame, according to prevailing constructions, will remain in a horizontal plane only under perfect track conditions. Low rail-joints throw the frame spring seat out of parallelism with the bolster spring seat, causing an unequal distribution of load over the springs so that the pressure is materially increased along one edge of the spring group and breakage of springs frequently results. The object of the present invention is to overcome the mentioned disadvantages accruing from the usual type of spring arrangement, and it consists in certain novel features of construction and arrangement which will be hereinafter first fully described and then more particularly pointed out in the appended claims.

In the annexed drawings, Figure 1 is a plan view of a portion of a car truck, showing one embodiment of my invention;

Figure 2 is a side view of the same;
Figure 3 is a central transverse section;
Figure 4 is a vertical section taken longitudinally of the spring plank showing a second embodiment of the invention;
Figure 5 is a section on the line 5—5 of Fig. 4;
Figure 6 is a view similar to Fig. 4 showing a third embodiment of the invention, and
Figures 7 and 8 show different forms of keys.

The side frame 1 is constructed at its ends to receive the journals, as indicated at 2, and at its center has an opening 3 to receive the end of the bolster 4 and the springs 5 upon which the end of the bolster rests. In the bottom 6 of the side frame is formed a pocket 7, and the end of the spring plank 8 is turned down, as at 9, to fit snugly in the pocket, the plank, of course, extending between and connecting the two side frames of the truck. The springs rest upon a spring seat 10 which extends through the lower portion of the opening 3 in the side frame and over the pocket 7 with one end fitting between the side flanges 11 of the spring plank 8. To impart stiffness and strength to the spring seat, it is provided with side flanges 12 which fit freely between the flanges 11 of the spring plank which latter flanges terminate at the side frame and fit closely between the lugs or flanges 13 on the side frame. It will be readily noted that there is a concentration of stress on the bend at the end of the spring plank when one side of the truck is held back of the other side, as when rounding a curve, and the bad effects of this stress is minimized by the interfitting engagement of the flanges.

The weight of the springs is, of course, carried by the spring seat 10 which, by extending over the end of the plank, holds the plank firmly in place. By referring to Figure 1, it will be noted that the springs are not arranged in rectangular relation but are staggered and in parallel lines or rows so that a spring in one row or line partly enters between two springs in the adjacent row or line. This arrangement permits the use of a larger number of springs of smaller diameter than heretofore and brings the springs into a narrower space, and the narrow seat is advantageous in regard to both the life of the springs and the strength of the frame, as hereinbefore explained. When the spring group is reduced in width it must be made longer in order to provide equivalent or greater capacity. As a loaded car sways from side to side over uneven track, there is a continual shearing displacement set up between the bolster spring seat and the frame spring seat, and this shear is transmitted through the spring groups and introduces in the springs stresses for which they were not designed in addition to those for which they were designed. The stresses are effectually met by the increased length of the spring group with an increased number of springs which add strength in the favorable direction and prolong the life of the springs. With the increased length of the spring group, however, there is an unequal distribution of pressure upon the opposite ends of the group when the bolster is tilted under a heavy side bearing load or blow. To overcome this inequality, I provide equalizing means consisting of a rib or rocker 14 on the under side of the spring seat, at the center thereof, fitting within the pocket 7 and formed in its lower face with a transverse concavity 15 resting on a convex saddle 16 in the pocket. The saddle may be on the end of the spring plank or directly on the floor of the pocket and constitutes a fulcrum or support about which the angularity of the bolster will freely accommodate itself.

At the top of the central opening 3 in the side frame, in each side thereof, is a groove or reentrant recess 17 which permit the frame to be passed over the end of the bolster, the projections 18 on the bolster passing through said recesses or grooves, and the bolster then being lowered to rest upon the springs. The movement of the frame over the bolster is arrested by contact with the lugs 19 on the bolster, and L-shaped keys 20 are then fitted between the projection or lug 18 and the outer side of the frame to lock the frame to the bolster, the foot of each key engaging a groove or recess 21 in the under side or spring seat of the bolster and being held against release by contact with the springs and by the lugs 22 at the inner ends of the keys engaging in recesses provided therefor in the under side of the bolster. Instead of the L-shaped key 20, shown in Figure 7, a single U-shaped key 40, shown in Figure 8, could be used. With this type of single key, there would not have to be the recess for the lug 22 or the hole in the bottom of the bolster for its reception, but the groove 21 would extend the full width of the bolster. With both of these constructions, the key or keys are between the bolster and springs and they are held or secured in place primarily by the weight or load carried by the bolster and springs. Heretofore the opening 3 in the frame has been wider in its lower portion than in its upper portion to permit it to pass over the outside column lugs of the bolster which construction required a relatively longer spring seat member on the frame. The relatively shorter length permitted by the construction herein set forth adds materially to the strength of the device.

In the form of the invention shown in Figs. 4 and 5 the saddle, 23, rests on ribs 24, formed on the floor or bottom of the pocket in the side frame, and rises through an opening 25 in the spring plank 26 which extends through the opening in the side frame. The side walls of the spring seat opening in the side frame are offset, as at 27, to accommodate the side flanges $26^1$ of the spring plank, and the saddle is provided at each end with a lip 28 which overhangs and rests upon the bottom web of the spring plank at the side of the opening 25. The springs are carried by a spring seat 29 which is provided on its under side with a rocker 30 bearing upon the saddle as in the first described form. In the form of the invention shown in Figures 4 and 5, the spring plank is a continuous channel member, with the exception of the opening 25, and thus avoids concentration of the corner stresses. The lip 28, bearing upon the floor of the spring plank, serves to anchor the spring plank by reason of the superposed weight.

In Figure 6, the side frame has its spring seat member formed with a depressed web 31 extending across the pocket or bottom channel of the frame, and the spring plank 32 has a depressed portion 33 seating in said depressed web and furnishing a seat or saddle for the convex rocker 34 on the under side of the spring seat or carrier 35. This arrangement simplifies the construction of the spring plank and omits the separate saddles used in the first described forms.

Having fully described my invention what I claim as new and desire to secure by Letters-Patent, is:—

1. In a car truck, the combination of a side frame, a bolster, a spring plank engaged with the side frame, a spring seat supported by the bottom member of the side frame for transverse rocking movement, and a plurality of springs carried by the spring seat and supporting the end of the bolster, the springs being arranged in parallel rows and in staggered relation with the springs in one row partly between springs in an adjacent row.

2. In a car truck, the combination of a side frame having a bolster-receiving opening therethrough, a spring seat extending through the lower portion of the opening and supported by the bottom member of the side frame, a bolster having its end extending through the upper portion of the opening, a group of springs resting on the spring seat and supporting the end of the bolster within the opening, the spring seat being entirely free of the bolster, and interengaging means on the under side of the spring seat and the bottom member of the side frame whereby the spring seat may rock transversely of the side frame.

3. In a car truck, the combination of a side frame, a saddle thereon, a spring seat having a concave recess on its under side resting on the saddle, a group of springs resting on the spring seat, and a bolster having its end supported by the springs.

4. In a car truck, the combination of a side frame having an opening therethrough to receive an end of a bolster and provided with a longitudinally extending pocket in the bottom of said opening, a saddle in said pocket, a spring seat extending through the opening in the side frame and provided on its under side with a concave rib fitting in the pocket and resting on the saddle, a group of springs resting on the spring seat, and a bolster having its end inserted through the opening in the side frame and resting on the springs.

5. In a car truck, the combination of a side frame having an opening therethrough to receive a bolster and having a pocket in the bottom of said opening, a spring plank having its end downturned and fitted in the pocket, a spring seat bridging the pocket and bearing on the end portion of the spring plank, a group of springs carried by the spring seat, and a bolster having its end extending through the opening in the side frame and resting on the springs.

6. In a car truck, the combination of a side frame having an opening therethrough to receive a bolster, a spring plank having its end engaged in the bottom of said opening and provided with side flanges terminating against the inner side of the side frame, a spring seat extending through the opening in the side frame and provided with side flanges, the end of the seat fitting closely between the flanges on the spring plank, lugs on the side frame fitting against the outer sides of the flanges on the spring plank, a group of springs resting on the spring seat, and a bolster having its end extending through the opening in the side frame and resting on the springs.

7. In a car truck, the combination of a side frame having a bolster-receiving opening, a spring plank provided with upstanding side flanges and having its end engaged in the lower portion of the bolster-receiving opening, a spring seat extending through the opening above the spring plank and having upstanding side flanges, the inner end of the spring seat fitting between the side flanges of the spring plank, springs carried by the spring seat, a bolster having its end engaged through the opening and resting on the springs, and means whereby the spring seat may rock transversely of the side frame.

8. In a car truck, the combination of a side frame, a spring plank resting in the side frame, and a spring carrier above the spring plank and provided on its underside with a rocker.

9. In a car truck, the combination of a side frame, a spring plank carried thereby, a spring carrier supported by the bottom member of the side frame and adapted to rock transversely of the frame, and means whereby the frame, the spring plank and the spring carrier are interlocked in normal relation.

10. In a car truck, the combination of a side frame, a spring plank interlocked with the side frame, and a spring carrier engaged with the plank and adapted to rock transversely of the frame.

In testimony whereof, I have signed this specification.

SAMUEL PRESCOTT BUSH.